（12） United States Patent
Kennedy, Jr.

(10) Patent No.: US 9,530,023 B1
(45) Date of Patent: Dec. 27, 2016

(54) REACH OBJECTS

(71) Applicant: Vinyl Development LLC, Miami Beach, FL (US)

(72) Inventor: Thomas R. Kennedy, Jr., Miami Beach, FL (US)

(73) Assignee: Vinyl Development LLC, Miami Beach, FL (US)

( * ) Notice: Subject to any disclaimer, the term of this patent is extended or adjusted under 35 U.S.C. 154(b) by 0 days.

(21) Appl. No.: 14/976,157

(22) Filed: Dec. 21, 2015

(51) Int. Cl.
*G06F 7/00* (2006.01)
*G06F 17/30* (2006.01)
*G06F 21/62* (2013.01)

(52) U.S. Cl.
CPC ..... *G06F 21/6227* (2013.01); *G06F 17/30595* (2013.01); *G06F 17/30958* (2013.01)

(58) Field of Classification Search
None
See application file for complete search history.

(56) References Cited

U.S. PATENT DOCUMENTS

| | | | | |
|---|---|---|---|---|
| 6,954,220 B1 * | 10/2005 | Bowman-Amuah | | G06F 17/30893 707/999.009 |
| 7,711,750 B1 * | 5/2010 | Dutta | ................. | G06F 21/6227 707/784 |
| 7,971,230 B2 * | 6/2011 | Agarwal | ............. | G06F 21/6218 707/694 |
| 2004/0098445 A1 * | 5/2004 | Baumann | ................. | A61N 5/10 709/200 |
| 2010/0180339 A1 * | 7/2010 | Finlayson | ............. | G06F 21/604 726/21 |
| 2013/0332460 A1 * | 12/2013 | Pappas | ............. | G06F 17/30705 707/740 |

* cited by examiner

*Primary Examiner* — Tuan A Pham
(74) *Attorney, Agent, or Firm* — Fish & Richardson P.C.

(57) ABSTRACT

Methods, systems, and apparatus, including computer programs encoded on computer storage media, for a row level security. One of the methods includes receiving, by a computer device executing at least part of a functional logic tier of an application, a request from a user for one or more objects present in the functional logic tier. The method includes determining that a type of the requested objects is associated with an object representative of instance level security. The method includes in response to determining that the type is associated with the object, determining access is authorized to at least some of the objects, determining access comprising accessing, by a computer device executing at least part of a data tier of the application, a link data structure that links the user with at least some of the objects. The method also includes providing the at least some of the objects to the user.

12 Claims, 9 Drawing Sheets

REACH OBJECTS

BACKGROUND

Row-Level Security enables customers to control access to rows in a database table based on the characteristics of the user executing a query (e.g., group membership or execution context). Row-Level Security (RLS) simplifies the design and coding of security in your application. RLS enables you to implement restrictions on data row access. For example ensuring that workers can access only those data rows that are pertinent to their department, or restricting a customer's data access to only the data relevant to their company.

However, many systems share a common database connection such that a database is unaware of the particular user accessing the database. Instead, an application is used to regulate access to the data.

SUMMARY

In general, one innovative aspect of the subject matter described in this specification can be embodied in methods that include the actions of receiving, by a computer device, executing at least part of a functional logic tier of an application, a request from a user for one or more objects present in the functional logic tier. The methods include the actions of determining that a type of one of the one or more requested objects is associated with an object representative of instance level security. The methods include the actions of in response to determining that the type is associated with the object representative of instance level security, determining access is authorized to at least some of the one or more objects, determining access including accessing, by a computer device executing at least part of a data tier of the application, a link data structure in the data tier of the application that links the access authorized user with at least some of the one or more objects. The methods also include the actions of providing the at least some of the one or more objects to the access authorized user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Multiple objects representative of instance level security may be associated with the link data structure. Multiple objects representative of instance level security may be associated with the same type of object. The object representative of instance level security may be associated with a name and wherein determining the user is authorized to access at least some of the one or more objects is based at least in part on the name. Securing the object using the object representative of instance level security may not require change to a user interface accessing the business object. The link data structure may be a table in a relational database.

Particular embodiments of the subject matter described in this specification can be implemented so as to realize one or more of the following advantages. Objects can be secured at the instance level. Row level security can be implemented at the data and object level without requiring adjustment to the presentation tier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

User interfaces can be implemented using data from multiple data sources. Organizations tend to store information in many disparate data sources. These data sources can include relational databases, enterprise products, data warehouses, and cloud based data systems. This use of disparate data sources can arise for many reasons, including the continued use of older systems, the selection of disparate "best in class" systems for different functionality, newer systems potentially being built that use newer technology while older systems remain, third party products being potentially purchased but perhaps not offering the complete suite of functionality desired by an organization, etc.

Figure 1:
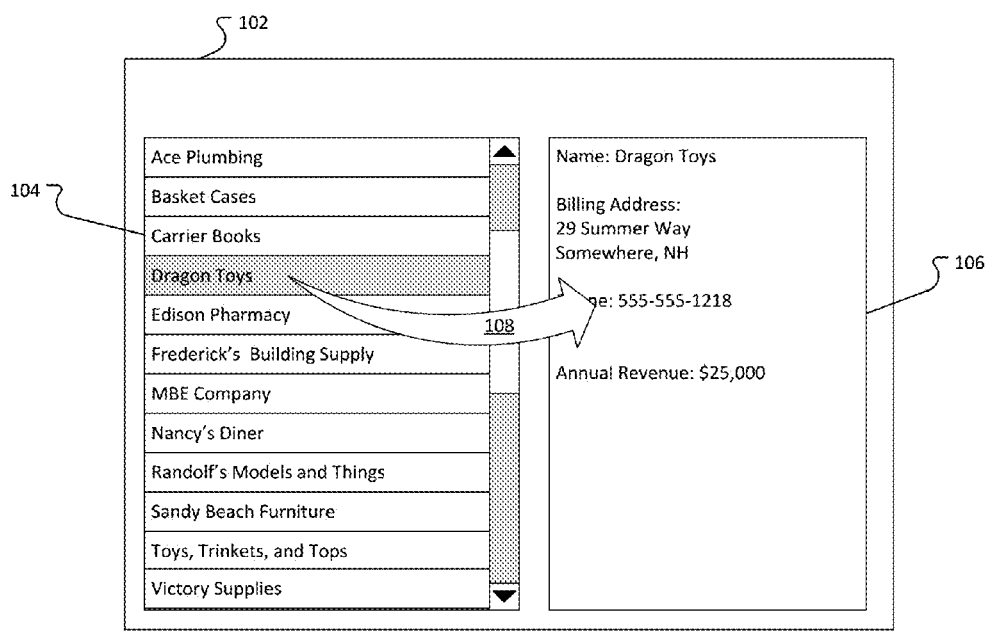
FIG. 1 illustrates an example of a user interface.

FIG. 1 illustrates an example user interface 102 includes a first panel 104 and a second panel 106. The first panel 104 includes a list of items and the second panel 106 displays information about a selected item in the list on the first panel 104 (the selection being graphically represented by an arrow 108). The example in FIG. 1 illustrates the first panel 104 as containing a list box. A list box can be considered a graphical control element that allows a user to select one or more items from a list contained within a static, multiple line text box. Other graphical controls that allow a user to select an item from a predetermined list can be used and are consistent with the example. For example, the user may select from a drop-down list, which is a graphical control element similar to a list box that allows the user to choose one value from a list. When a drop-down list is inactive, it displays a single value. When it is activated, it displays (drops down) a list of values from which the user may select one value. When the user selects a new value, the control reverts to its inactive state, displaying the selected new value.

Complexity is introduced when the data used to generate the list in the first panel 104 is stored, at least in part, in a data store that is separate from the data store that contains the information presented in the second panel 106.

Figure 2:
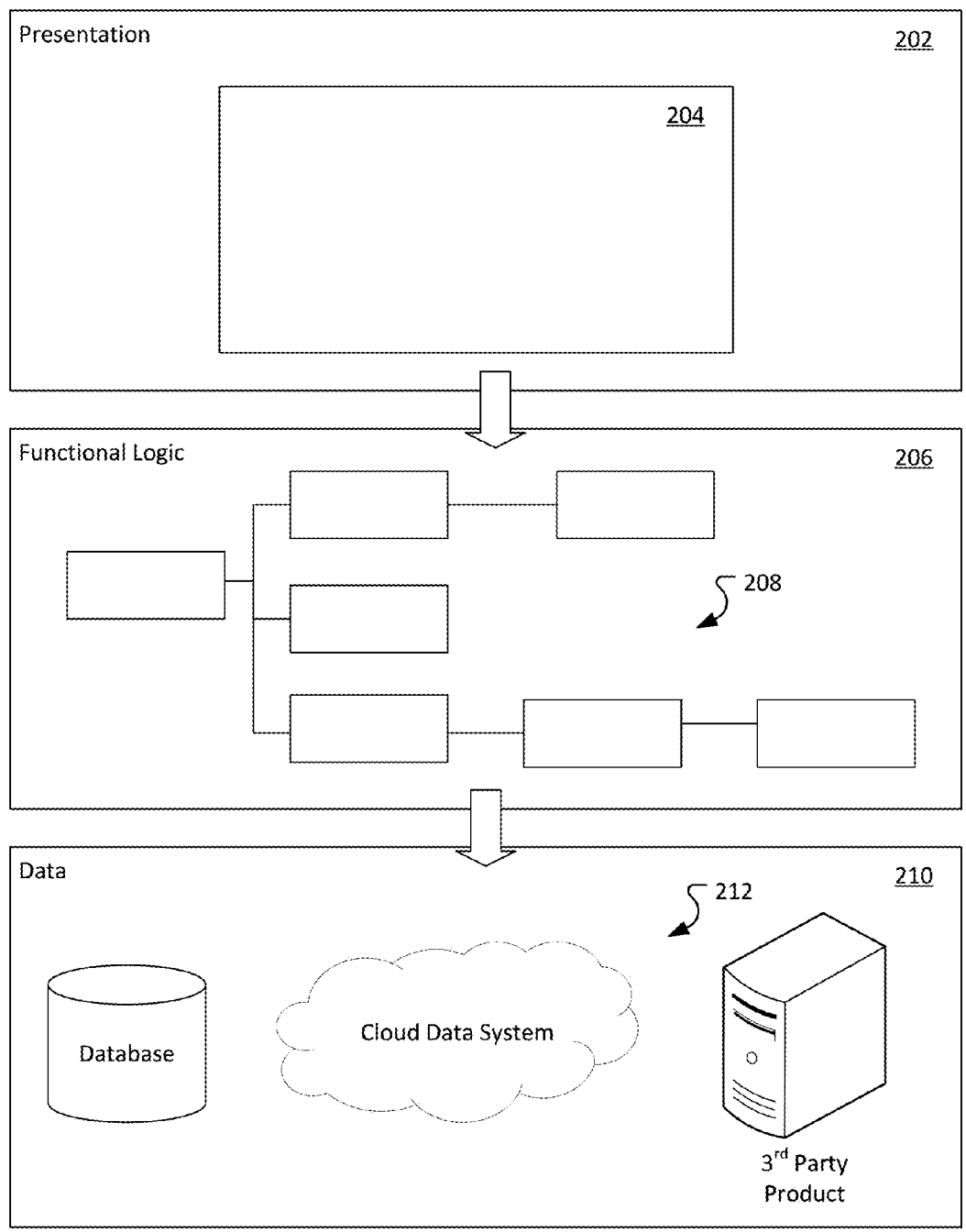
FIG. 2 illustrates an example of a three-tier architecture.

FIG. 2 illustrates an example of a three-tier architecture. In general, a multi-tier architecture can be a client-server architecture in which presentation, application processing, and data management functions are physically separated. One often-implemented multi-tier architecture is the three-tier architecture. Three-tier architecture is a client-server architecture in which a presentation tier 202 (for example, user interface 204), functional logic tier 206 (for example, an object model 208), and data architecture tier 210 (for example, data storage systems 212) are developed and maintained as independent modules, frequently on separate platforms.

In some arrangements, the presentation tier 202 can be the top-level of an application. The main function of the presentation tier can be to translate business processes into a form the user can understand. The functional logic tier 206 can coordinate the application, process commands, perform calculations, etc. and make logical decisions, evaluations, etc. The data tier 210 often coordinates the storage and retrieval of data from one or more data storage systems.

In general, each tier of the architecture interacts with one of the other tiers (e.g., one adjacent tier). In this example, a tier may interact with the tier that is graphically represented as being directly below it. As such items in a tier can interact with items in the tier directly below. For example, the user interface 204 may access the object model 208. Further, the object model 208 can access a function provided by the data storage systems 212. The user interface 204, however, would generally not interact with the data storage systems 212 directly, as the data storage systems 212 is not directly below the user interface 204, in this example.

Different types of developers may focus on different tiers. For example, GUI designers and web developers may focus on the presentation tier 202. Application developers and business architects may focus on the functional logic tier 206. Database administrators and database programmers may focus on the data tier 210. In some scenarios, certain types of developers may focus on multiple tiers. For example, security can be an enterprise specialty that influences each of the tiers mentioned above.

Generally, if a user has access to a data source in the data tier, the user can access everything contained within that data source. For example, access to the customer table may allow the user to view the entire customer table. It is not always desirable, however, to allow users to access all the data in a particular data source. A reach object can be used in conjunction with an object in the functional logic tier in order to secure individual data items. For example, a customer object may have a type that is associated with a reach object. All individual customers can be associated with the reach object. The association is a signal that data in each customer object is protected on a customer by customer basis. For example, one user may have access to some customers but may not have access to others.

In the data tier, securing individual data items is referred to as row-level security. Row-level security refers to relational databases where data is stored in a table. The fields of the data are referred to as columns while entries in the table are referred to as rows. With row-level security, users can have access to a table or other data source without having access to all rows on that table. For example, a user may be authorized to view some rows (e.g., customers) but not authorized to view other rows (e.g., other customers). In some implementations, software components may be created to control and manage access to data stored in data storage systems. For example, one or more data objects may enable access to a table or portions of a table in a relational database.

Figure 3:
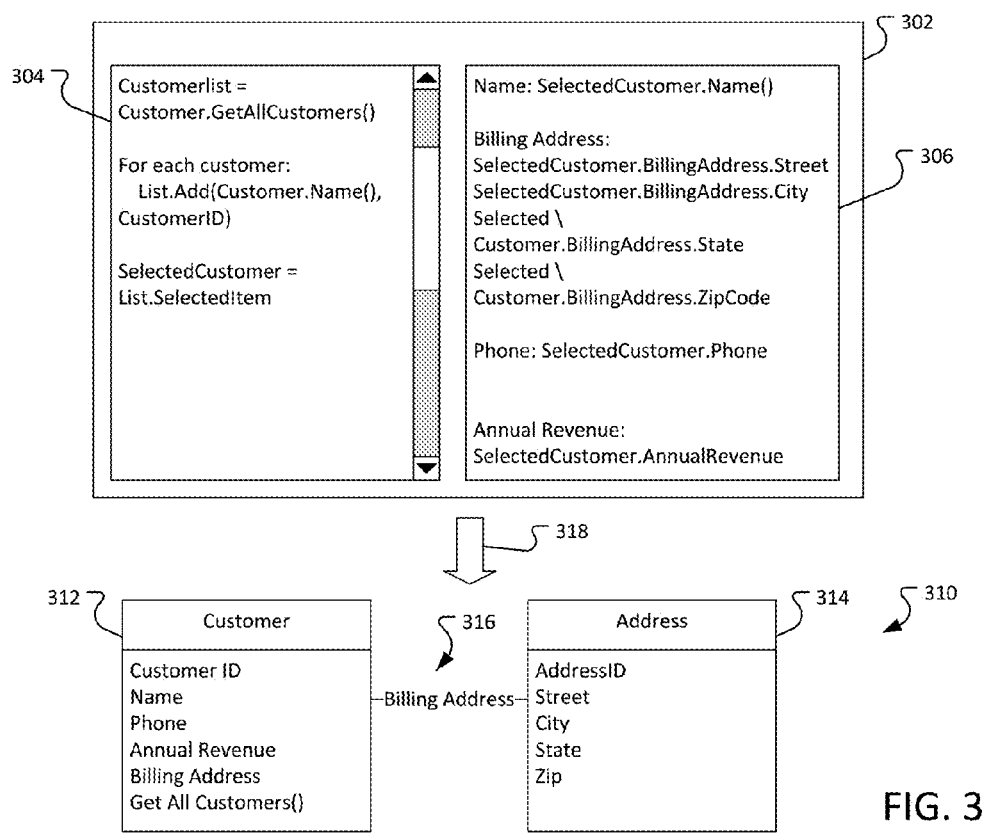
FIG. 3 illustrates an example of a user interface in a presentation tier that is accessing objects in a functional logic tier.

FIG. 3 illustrates an example of a user interface 302 in a presentation tier that is accessing objects in a functional logic tier. The user interface 302 includes a first panel 304 and a second panel 306. The first panel 304 and the second panel 306 present pseudo code, which when executed, would then populate panel 304 with a customer list—from which a customer can be selected, and populate panel 306 with information (address, phone number, etc.) for the selected customer.

A customer object 312 and an address object 314 reside in the functional logic tier of the application, which is located below the presentation tier as graphically represented by an arrow 318. Links can form among objects that reside in these tiers, such as the customer object 314 and the address object 314. For example, a relationship 316 exists between the customer object 312 and the address object 314, which can be used to identify the billing address of a particular customer.

One technique used in developing applications in the functional logic tier is object-oriented programming. Object-oriented programming a class or type of an object represents the object generally (herein referred to a class of type). A class of type of the object may be a customer or a product. This is distinguished from an object or instance, which references a particular thing. An instance may represent the customer "John Smith" or the product "Pet Rock." (herein referred to as an object or instance).

Based upon the presentation tier being position above the functional logic tier in this example, the user interface 302 can access the objects 312, 314. To access the objects, one or more techniques may be employed, for example, the first panel 304 (of the user interface 302 which may be user interface 102 of FIG. 1) may include pseudo code sufficient to generate a list of customers (for example, the list of customers in the first panel 104 of FIG. 1). In order to populate the first panel 304 of the user interface 302, the user interface may access the customer object 312. In this example, a GetAllCustomers( ) method on the customer object 312 can be used to obtain a list of all customers. The application iterates over the list of returned customers and adds the name of each customer to the list presented in the first panel 304. The pseudo code also allows for a customer to be selected from the list of customers.

The second panel 306 includes pseudo code sufficient to populate the second panel with information about the customer object 312. In this example, the second panel 306 is populated with the name of the customer selected from the customer list in panel 304. The pseudo code 306 includes instructions that use the relationship 316 to navigate from the object 312 of the selected customer. The pseudo code 306 also identifies a billing address provided by the address object 314. The pseudo code 306 also navigates the billing address relationship 316 in order to identify the billing address 314 for the selected customer. The second panel 306 is populated with the street, city, state, and zip code of the billing address. The second panel 306 is also populated with the selected customer's phone number and annual revenue.

Developing a user interface by using these objects allows a developer to produce a user interface without regard for where the underlying data is stored. Instead, coordinating between the objects and the persistent data is relegated to the functional object and data tiers.

Figure 4:
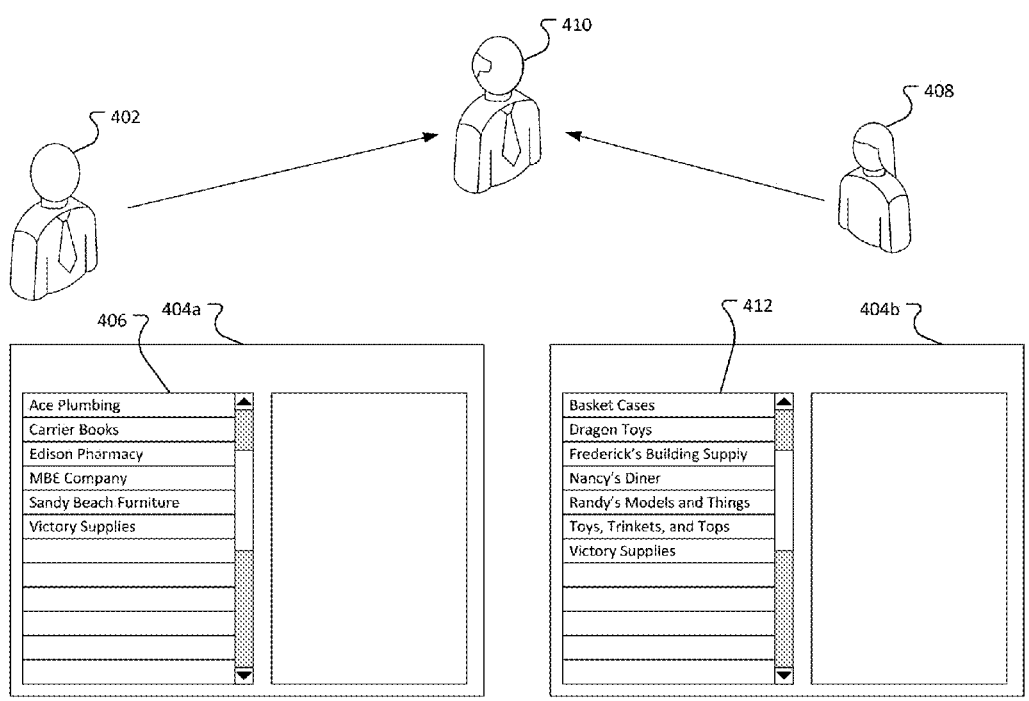
FIG. 4 illustrates an example of limiting user access to data.

FIG. 4 illustrates an example of limiting data access by the user. In this example, customers are protected individually. When user 402 accesses an user interface 404a, he is shown a list of customers 406. In this example, the list of customers 406 consists of Ace Plumbing, Carrier Books, Edison Pharmacy, MBE Company, Sandy Beach Furniture, and Victory Supplies.

When a different user 408 accesses a user interface 404b, she is shown a different list of customers 412. In this example, the customers include Basket Cases, Dragon Toys, Frederick's Building Supplies, Nancy's Diner, Randy's Models, Things, and Toys, Trinkets, and Tops, and Victory Supplies.

User 402 and user 408 may have access to different data even though the user 402 and the user 408 may have the same role within the organization. The ability to see data records is not necessarily limit a single customer to a single user. For example, both the user 402 and the user 408 can view the "Victory Supplies" record. Further, the user 402 and the user 408 may each report to a manager 410. The manager may be authorized to view all of the data of both users.

Figure 5:
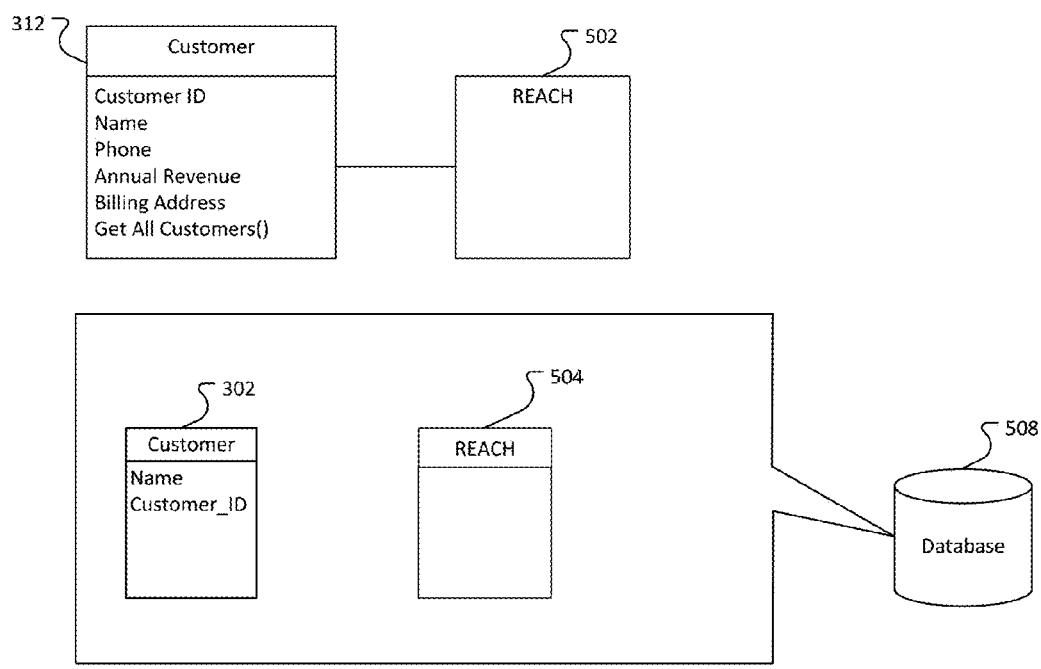
FIG. 5 illustrates a reach object in the functional logic tier and the data tier.

FIG. 5 illustrates a reach object in a functional logic tier and a data tier. As described above, a functional logic tier may include objects that may be used by a presentation tier (for example, the customer object 312). Also, as described above, at least some of the data associated with customer object is available from the customer table 302 (shown in FIG. 3).

In order to provide row-level security, a reach object may be associated with a different type of object. In this illustrated example, a reach object 502 is associated with the customer object 312. A relationship between the reach object 502 and the customer object 312 may be established, for example, by a security specialist. Within a database (databases are applications that store data and are generally considered part of the data tier), one or more reach tables 504 can be created to support the reach functionality, as described further below.

The reach table 504 enables row-level security to be applied to customer objects in a manner such that neither a developer operating in the functional logic tier using the object nor a developer developing in the presentation tier need be aware of the security. For example, referring again to FIG. 4, the user 402 may receive the list 406 and the user 408 may receive the list 412 when executing the logic as described in the first panel 304 of FIG. 3, without further modification.

Instead, by associating the reach table 504 with the customer object, row-level security becomes ascribed to the customer object.

In scenarios where a user may be able to access some fields but not able to access other fields in a data source, multiple data objects can be used. For example, some users may be authorized to access customer records from a particular geographic region, but only a subset of the users may be authorized to view the customer's social security number. In this scenario, multiple data objects can be created for the customer, one with the social security number and one without the social security number. Each of the two customer data objects may be associated with different reach objects, enabling row level or instance level security to be implemented separately for each data object.

Figure 6:
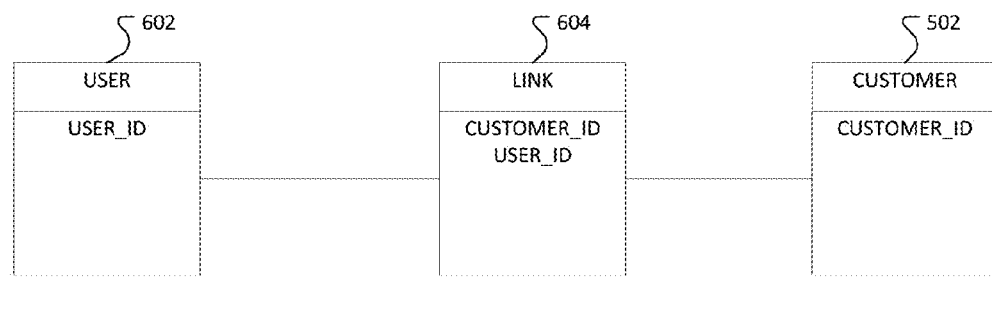
FIG. 6 illustrates an example table structure to support row level data security.

FIG. 6 illustrates an example table structure to support row-level data security. To provide row level security for customers a table structure allows individual users to be associated with customers. Each user can be associated with zero or more individual customers.

A database may include a user table 602. The user table 602 may include a user identification (user_ID) for each user of the system. The user_ID may be, for example, a primary key of the user_table, or may be any field or combination of fields on the user table that provides a unique value. A customer table 502 is the table that is to be secured. A link table 604 can be used to link rows from the user table 602 to rows in the customer table 502. Each row in the link table 604 includes an identifier for a customer and an identifier for a user. The row indicates that the user, identified by the user_ID is authorized to access the customer identified by the customer_ID. In some implementations, the link table 904 may be particular to the user and customer table. For example, there may be a different link table to provide row level security to a product table.

Database requests can be dynamically modified to join an access request with the user_customer table. For example, the SQL statement 608 enables a user to access all of the customer information for which he is authorized.

Figure 7:
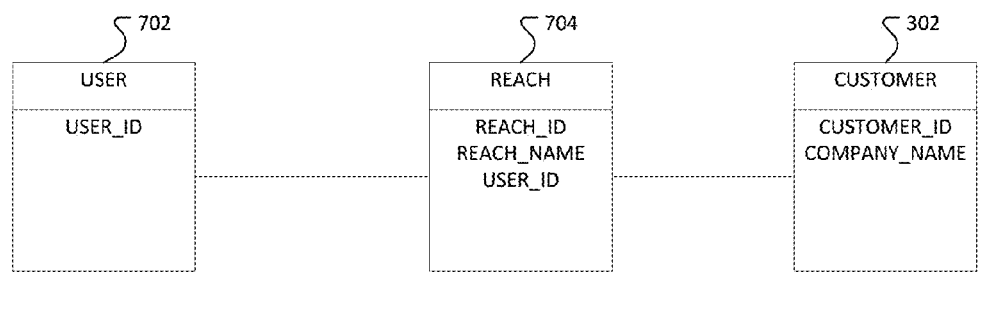
FIG. 7 illustrates an example of another table structure that can support row-level data security.

FIG. 7 illustrates another example of a table structure that can support row-level data security. In this implementation, a reach table 704 can be used to provide row-level security to a database. In this example, the database includes a user table 702 with a user_ID column. As described above, the user table 702 may include an entry (row) for each user of the overall system. The reach table 704 provides a single link between the user table 702 and different tables protected by row-level security. In general, the reach table 704 may be a link table that enables the user table 702 to join with multiple different tables. The reach table 704 may include one or more fields, for example, a reach_ID field, a reach_name field, and a user_ID field. The reach_ID is the primary key of the row that is protected and to which the user has access. In general, a primary key is a key in a relational database that is unique for each row in a table. The reach_name is an identifier that can be used to identify the other table to which the row applies. For example, a reach name of "customer" may indicate that the row applies to the customer table, a reach name of "product" may indicate that the row applies to a product table. The reach_name can be the name of the table to join, or, alternatively, the reach_name may be a numeric identifier that represents the table.

As described above, database requests can be dynamically modified to join the table that is the subject of the access request with the user_reach table. For example, the SQL statement 708 enables a user to access all of the customer information for which they are authorized.

In implementations where each row in the database receives its own unique primary key and no two primary keys are the same (for example, a single sequence is used to generate all keys in the database), the reach_name column in the reach table 704 may not be necessary in order to uniquely identify a particular row in a particular table. Instead, as each reach_ID uniquely identifies a single row in the database, the reach_ID may contain all necessary information to provide row-level security.

In some implementations, multiple reach objects may be associated with the same business object. For example, row-level security can be applied based on different criteria. For example, row level data can be secured based on user ID and also based on office location, or other criteria.

Figure 8:
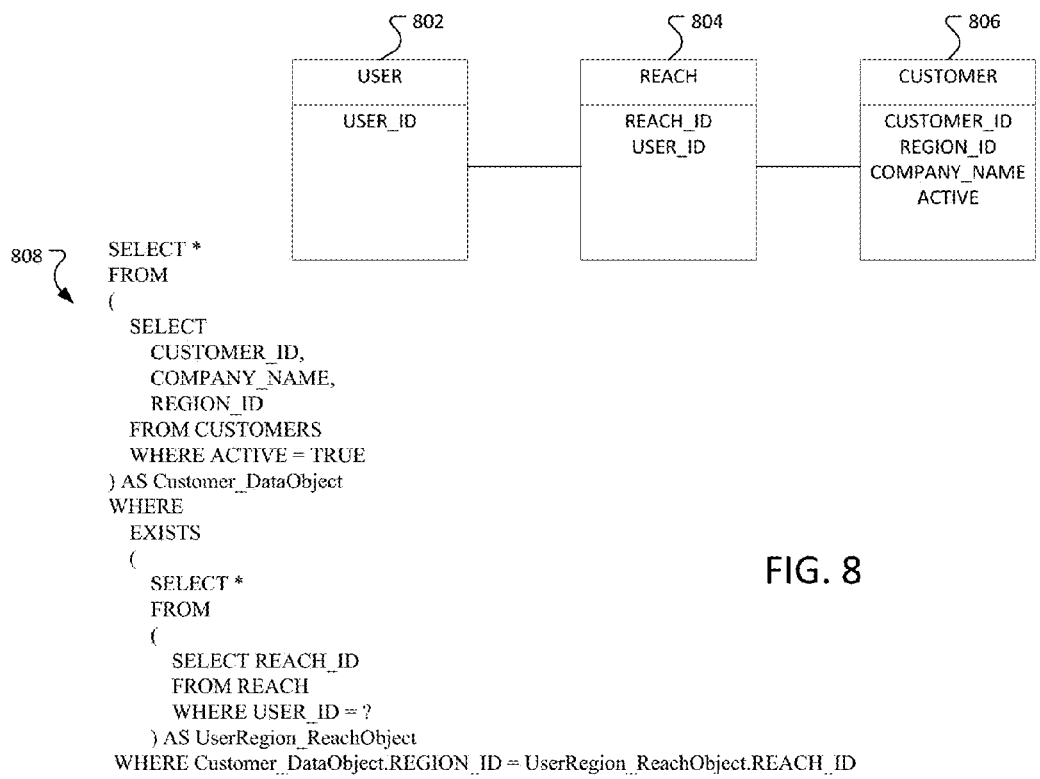
FIG. 8 illustrates an example of row-level data security using a foreign key.

FIG. 8 illustrates an example of row-level data security using a foreign key. In some scenarios, a system may wish to protect an object based on a criteria other than the identity of the object. For example, instead of protecting each customer object individually, the system may assign each customer to a region. Regions can, for example, reflect a geographic area where the company is located (for example, New England, The Mid West, etc.).

For example, a user table 802 includes a user_id column, a reach table 804 includes a reach_id column and a user_id column, a customer table 806 includes a customer_id, a region_id, a company_name, and an active indicator.

In this implementation, the reach table 804 can be used to provide row-level security to a database. The user table 802 may include an entry (row) for each user of the overall system. The reach table 804 provides a single link between the user table 1002 and a region table protected by row-level security. The reach_ID is the primary key of the row that is protected and to which the user has access (in this example, a region). Each customer is associated with a region.

In this example, each user may have permission to view customers that are associated with a particular region. For example, a sales manager in the Midwest may have permission to view customers located in the Mid West, but not customers located in New England.

The system may further restrict access only to "active" customers. One example, of a database request executed in the data tier that may get a list of all active customers is:

SELECT
    CustomerId,
    CompanyName,
    RegionId
FROM Customers
WHERE Active=True In order to restrict the customers in the list by the regions to which the user has access the database requests can be dynamically modified to join the table that is the subject of the access request with the reach table. For example, the SQL statement 808 enables a user to access all of the customer information for customers in regions for which the user is authorized.

Figure 9:
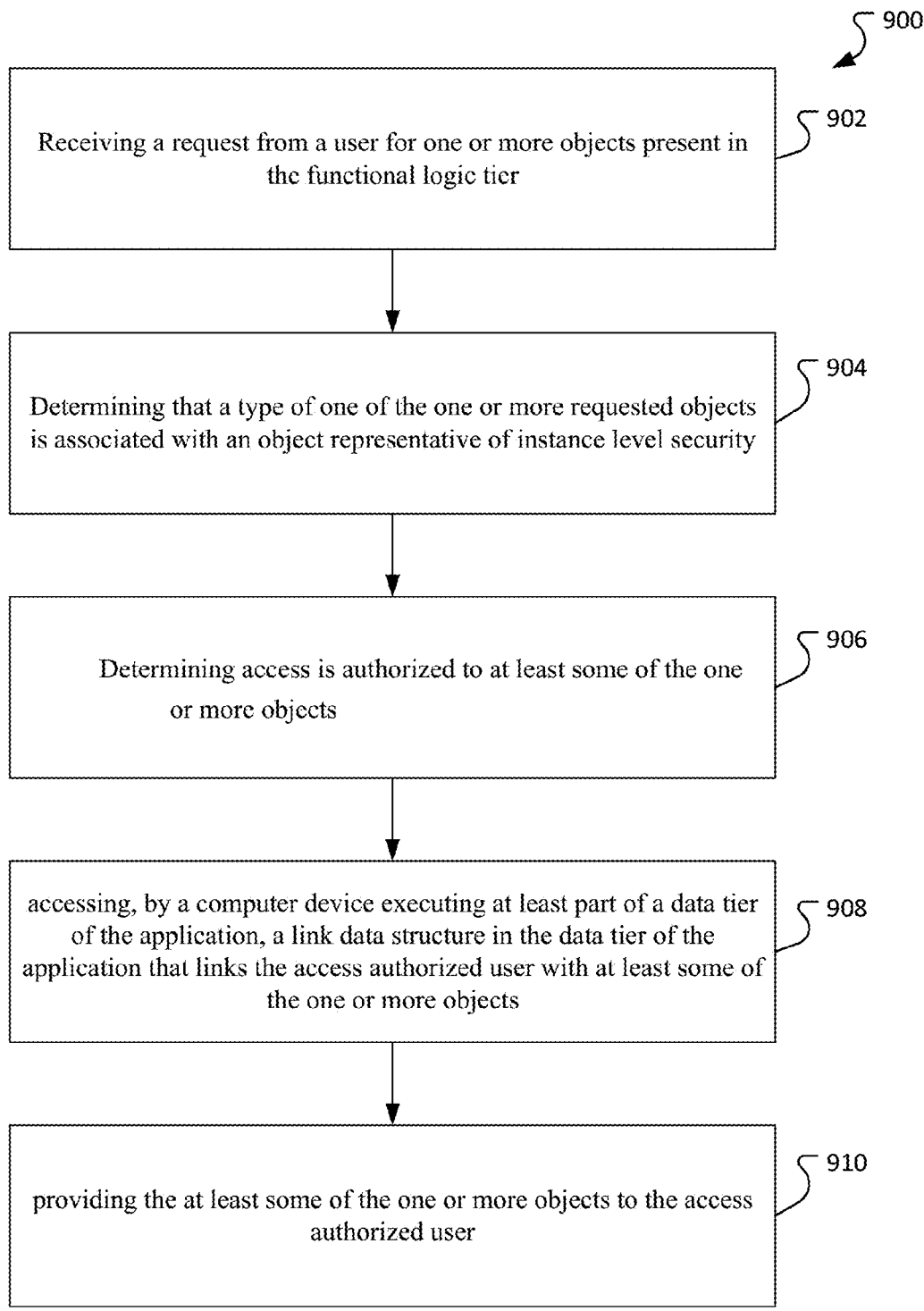
FIG. 9 is a flowchart for an example process for implementing row level security.

FIG. 9 is a flowchart for an example process 900 for implementing row level security. The process 900 may be performed by a computer processing system including one or more computer processors and a non-transitory storage medium storing instructions that cause the computer processing system to execute the process.

The process 900 can receive 902 a request from a user for one or more objects present in the functional logic tier.

The process 900 can determine 904 that a type of one of the one or more requested objects is associated with an object representative of instance level security.

The process 900 can determine 906 access is authorized to at least some of the one or more objects.

The process 900 can access 908, by a computer device executing at least part of a data tier of the application, a link data structure in the data tier of the application that links the access authorized user with at least some of the one or more object The process 900 can provide 910 the at least some of the one or more objects to the access authorized user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions), encoded on computer storage medium for execution by, or to control the operation of, data processing apparatus.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language (including compiled or interpreted languages or declarative or procedural languages) and it can be deployed in any form (including as a stand-alone program or as a module, component, subroutine, object, or other unit suitable for use in a computing environment). A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few). Devices suitable for storing computer program instructions and data include all forms of non-transitory computer-readable media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer that has a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile feedback), and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), a middleware component (e.g., an application server), or a front end component (e.g., a client computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for providing instance level security in an object-oriented application comprising:
   receiving, by a computer device, executing at least part of a functional logic tier of an application, a request from a user for one or more objects present in the functional logic tier, the functional logic tier comprising objects, each object having a type;
   determining that a type of one of the one or more requested objects is associated with an object representative of instance level security;
   in response to determining that the type is associated with the object representative of instance level security, determining access is authorized to at least some of the one or more objects, determining access comprising:
      obtaining a data access statement configured to obtain data associated with the one or more objects from a data store;
      altering the data access statement to access an instance level security feature of the data store;
      accessing, by a computer device executing at least part of a data tier of the application, a link data structure in the data tier of the application that links the access authorized user with at least some of the one or more objects using the altered data access statement; and
   providing the at least some of the one or more objects to the access authorized user;
   wherein multiple objects representative of instance level security are associated with the link data structure;
   wherein the object representative of instance level security is associated with a name and wherein determining the user is authorized to access at least some of the one or more objects is based at least in part on the name.

2. The method of claim 1, wherein the multiple objects representative of instance level security are associated with the same type of object.

3. The method of claim 1, wherein securing the object using the object representative of instance level security does not require change to a user interface accessing the business object.

4. The method of claim 1, wherein the link data structure is a table in a relational database.

5. A non-transitory computer storage medium encoded with computer program instructions that when executed by one or more computers cause the one or more computers to perform operations comprising:
- receiving, by a computer device, executing at least part of a functional logic tier of an application, a request from a user for one or more objects present in the functional logic tier, the functional logic tier comprising objects, each object having a type;
- determining that a type of one of the one or more requested objects is associated with an object representative of instance level security;
- in response to determining that the type is associated with the object representative of instance level security, determining access is authorized to at least some of the one or more objects, determining access comprising:
  - obtaining a data access statement configured to obtain data associated with the one or more objects from a data store;
  - altering the data access statement to access an instance level security feature of the data store;
  - accessing, by a computer device executing at least part of a data tier of the application, a link data structure in the data tier of the application that links the access authorized user with at least some of the one or more objects using the altered data access statement; and
- providing the at least some of the one or more objects to the access authorized user;
- wherein multiple objects representative of instance level security are associated with the link data structure;
  - wherein the object representative of instance level security is associated with a name and wherein determining the user is authorized to access at least some of the one or more objects is based at least in part on the name.

6. The non-transitory computer storage medium of claim 5, wherein the multiple objects representative of instance level security are associated with the same type of object.

7. The non-transitory computer storage medium of claim 5, wherein securing the object using the object representative of instance level security does not require change to a user interface accessing the business object.

8. The non-transitory computer storage medium of claim 5, wherein the link data structure is a table in a relational database.

9. A system comprising: one or more computers comprising one or more processors, memory, and one or more storage devices storing instructions that are operable, when executed by the one or more computers, to cause the one or more computers to perform operations comprising:
- receiving, by a computer device executing at least part of a functional logic tier of an application, a request from a user for one or more objects present in the functional logic tier, the functional logic tier comprising objects, each object having a type;
- determining that a type of one of the one or more requested objects is associated with an object representative of instance level security;
- in response to determining that the type is associated with the object representative of instance level security, determining access is authorized to at least some of the one or more objects, determining access comprising:
  - obtaining a data access statement configured to obtain data associated with the one or more objects from a data store;
  - altering the data access statement to access an instance level security feature of the data store;
  - accessing, by a computer device executing at least part of a data tier of the application, a link data structure in the data tier of the application that links the access authorized user with at least some of the one or more objects using the altered data access statement; and
- providing the at least some of the one or more objects to the access authorized user;
- wherein multiple objects representative of instance level security are associated with the link data structure;
  - wherein the object representative of instance level security is associated with a name and wherein determining the user is authorized to access at least some of the one or more objects is based at least in part on the name.

10. The system of claim 9, wherein the multiple objects representative of instance level security are associated with the same type of object.

11. The system of claim 9, wherein securing the object using the object representative of instance level security does not require change to a user interface accessing the business object.

12. The system of claim 9, wherein the link data structure is a table in a relational database.

* * * * *